UNITED STATES PATENT OFFICE.

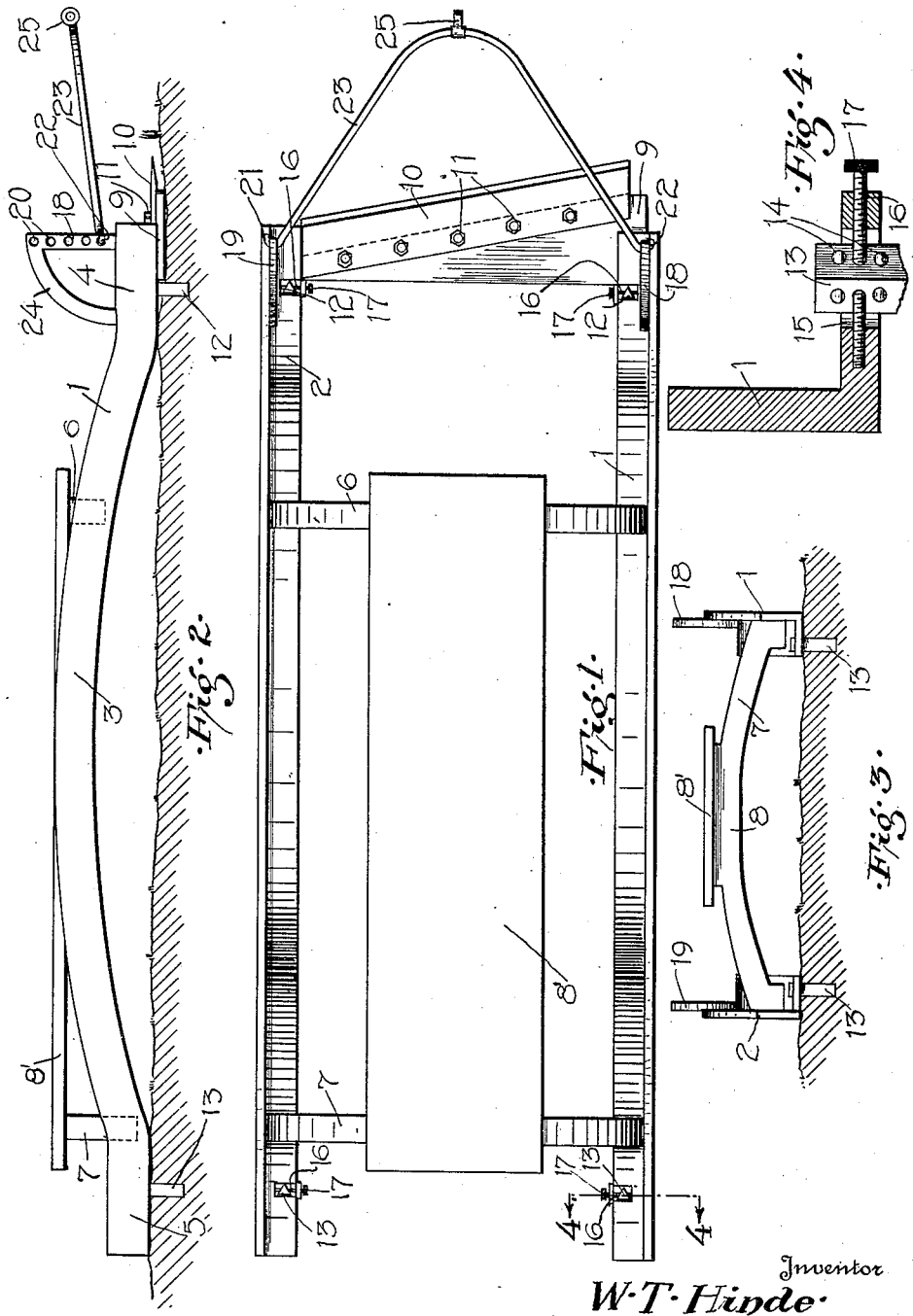

WILLIAM T. HINDE, OF TAOS, NEW MEXICO.

BRUSH-CUTTER.

1,096,170.  Specification of Letters Patent.  Patented May 12, 1914.

Application filed November 7, 1913. Serial No. 799,778.

*To all whom it may concern:*

Be it known that I, WILLIAM T. HINDE, a citizen of the United States, residing at Taos, in the county of Taos and State of New Mexico, have invented certain new and useful Improvements in Brush-Cutters; and I do hereby declare the following to be a full, clear, and exact description of the invention, such as will enable others skilled in the art to which it appertains to make and use the same.

My invention relates to new and useful improvements in brush cutters of the sled type that are constructed and arranged to cut or clear rough land of sage brush or other analogous plants in a reliable and efficient manner.

An important object of the invention is to provide a brush cutter which may be readily pulled across a field and will be prevented lateral movement with respect to the line of draft owing to novel means provided for that purpose.

Another important object is to provide guide pins that are carried by the runners of the cutter that are longitudinally adjustable and arranged so as to prevent lateral movement of the cutter without in any way impeding the progress of the cutter.

Another object of importance is to provide means whereby the depth of the cutter blades may be regulated readily.

A still further object is to provide a cutter such as above described which is simple as to construction and arrangement of parts, may be cheaply manufactured and is more commercially desirable for the reasons above stated.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which, similar reference numerals designate corresponding parts: Figure 1 is a top plan view of the device in assembled position, Fig. 2 is a side elevation illustrating the device in assembled operative position, Fig. 3 is a rear end elevation of the device, and Fig. 4 is a detail sectional view taken on line 4—4 of Fig. 1 and illustrating the manner of adjustably securing the guide pins to the runners of the frame.

Coming now to the description of the drawings the numerals 1 and 2 designate the side bars or what will be hereinafter referred to as runners of the cutter bar frame. These runners 1 and 2 are of angle iron and are bowed centrally of their ends as at 3 so that only the end portions 4 and 5 of each of the runners 1 and 2 are in a position for engagement with the ground as will be readily observed by reference to Fig. 2 in the drawings. The runners 1 and 2 are disposed in the desired spaced relation to each other and supported in that position by means of transverse connecting bars 6 and 7 that are each disposed adjacent the terminals of the runners 1 and 2 and are of angle iron. These transverse connecting bars 6 and 7 are bowed centrally of their ends as at 8 in Fig. 3 and are secured at their terminals to the runners 1 and 2 in any suitable manner. The bars 6 and 7 in being bowed after the manner described provide for clearance of the brush when the device is drawn across the field.

A preferably rectangular platform 8' is secured in any suitable manner to the transverse bars 6 and 7 longitudinally thereof and upon the upper face centrally of the ends thereof. The operator or driver may stand upon this platform 8' or suitable ballast or weights may be placed thereon to provide for the proper operation of the cutter.

A transverse bar 9 is carried adjacent one terminal of the runners 1 and 2 and secured thereto in any suitable manner. Mounted upon this bar 9 is a cutter blade 10 that is secured to the bar 9 by means of suitable bolts and nuts designated 11 as an entirety. The bar 9 is disposed angularly with relation to the runners. Thus the blade 10 carried upon the bar 9 is disposed in the same plane as is the bar whereby a sliding cutting action is had owing to the angular disposal of the blade 10 and the proper action is provided while breaking of the stalks or bushes to be cut is eliminated.

As a means for preventing the cutter being moved laterally while drawn across the field there has been provided upon each of the runners 1 and 2 adjacent the terminals thereof a pair of downwardly extending guide pins 12 and 13. These guide pins 12 and 13 are constructed and held upon the runners 1 and 2 in the same manner and it is therefore thought necessary to describe only one of them.

The guide pin 13 consists of a metallic pin that is triangular in cross section so that one of the edges thereof may be suitably sharpened to permit their free movement through the ground. A plurality of spaced openings 14 are formed through the pin 13 and are for a purpose which will be hereinafter more fully described.

The pins 12 and 13 are mounted within openings 15 that are formed adjacent each terminal through the runners 1 and 2 so as to be longitudinally adjustable within the openings.

A screw 16 is threaded within each of the terminals of the runners 1 and 2 transversely through the openings 15 therein and adapted to pass through certain of the openings 14 within the pins 12 and 13. A milled head 17 is provided adjacent one terminal of the screw whereby it may be readily removed from the runners 1 and 2. It will thus be seen that the depth regulation of the pins 12 and 13 is provided by the arrangement of the openings 14 and screws 16 above described. The depth regulation of the cutter blade 10 is regulated by the position of the draft gear after a manner which will be next described.

A pair of upstanding bars 18 and 19 are carried by the runners 1 and 2 adjacent the forward terminals thereof and are secured to the runners in any suitable manner. These bars 18 are provided with a plurality of spaced openings 20 that are adapted to receive the angularly bent terminals 21 and 22 of a draft bar 23. An arcuate bracing bar 24 is formed integral at one terminal with each of the upper terminals of the bars 18 and 19 and secured at its lower terminal in any suitable manner to the respective runners 1 and 2. These segmental rods 24 serve to brace the upstanding rods 18 and 19. The draft rod 23 is bent centrally of its ends and provided with a ring member 25 to which the swingletree or suitable draft appliance not shown may be attached for the purpose of dragging the cutter across the field.

It is apparent that the draft rod 23 when mounted within the lowermost of the openings 20 in the upstanding bars 18 and 19 will serve to dispose the cutter blade 10 when the cutter is dragged across the field in a position slightly spaced from the ground, that is, in an inclined position relative to the ground. When the terminals 21 and 22 of the draft rod 23 are mounted within the uppermost of the openings 20 in the upstanding bars 18 and 19 it will be apparent that the cutter blade 10 is pulled toward the ground and engages the brush or stalks to be cut at the point of their engagement with the ground.

It is not thought necessary to describe a more detailed operation of the device as the operation is apparent with the foregoing description.

It is apparent with reference to the foregoing description and drawings that a brush cutter is provided which will perform its function in a reliable and efficient manner so that large areas of rough ground may be cleared of brush or the device may be used for harvesting purposes as the case may be and serve in all instances to effectually and efficiently perform its function of cutting.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:—

1. A brush cutter comprising a pair of runners, said runners bowed centrally of their ends, transverse connecting bars secured to the runners adjacent each terminal thereof, said bars bowed centrally of their ends, a platform mounted longitudinally of said last named bars centrally of the ends thereof, an angularly disposed cutter blade carried at one terminal of the runners, a pair of guide pins carried adjacent the terminals of each runner and means for regulating the depth of said guide pins.

2. A brush cutter comprising a pair of spaced runners, said runners bowed centrally of their ends, a pair of connecting bars secured adjacent the terminals of the runners transversely thereof, a platform mounted upon said connecting bars, a pair of guide pins extending downwardly from each runner adjacent the terminals thereof, a pair of upstanding bars carried adjacent one terminal of the runners, a cutter blade carried by said runners, said upstanding bars provided with a plurality of spaced openings, a draft bar adapted to be mounted within certain of the openings and arcuate bracing bars carried by said upstanding bars and secured to said runners.

3. A brush cutter comprising a pair of runners, transverse connecting bars secured to said runners, a platform mounted upon said bars, a cutter blade carried at one of the terminals of said runners, downwardly extending guide pins adjustably mounted at each terminal of each of said runners and provided with spaced openings, screws mounted within the runners and adapted to extend through certain of the openings in said guide pins to hold them in adjusted position.

4. A brush cutter comprising a pair of runners, transverse connecting bars secured to said runners, a platform mounted upon said bars, a cutter blade carried at one of the terminals of said runners, downwardly extending guide pins longitudinally adjustably mounted at each terminal of each of said runners, a pair of draft bars secured to said runners, and provided with spaced openings, a draft rod adapted to be mounted within certain of said openings and arcuate brace rods formed integrally with the upper terminals of said draft bars and secured to said runners.

In testimony whereof I affix my signature in presence of two witnesses.

WILLIAM T. HINDE.

Witnesses:
 DWIGHT ALLESON,
 J. B. BROOKS.

Copies of this patent may be obtained for five cents each, by addressing the "Commissioner of Patents, Washington, D. C."